Jan. 15, 1924.
G. F. SPROULL
SEED PLANTER
Filed Nov. 18, 1920
1,480,963
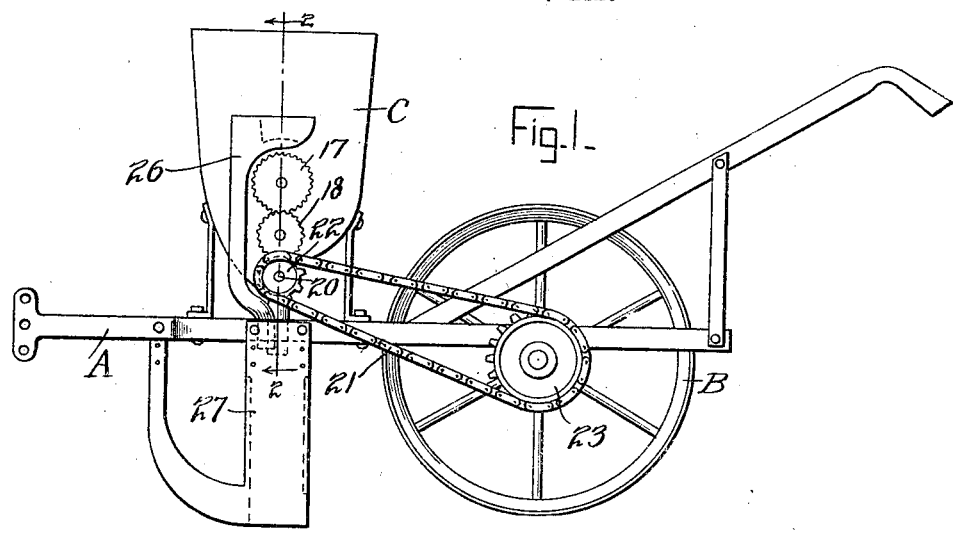
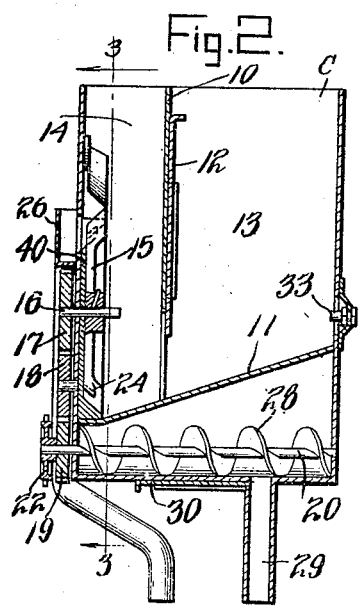 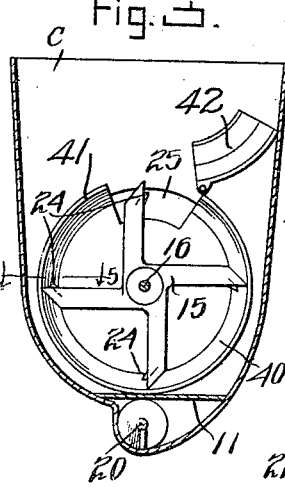 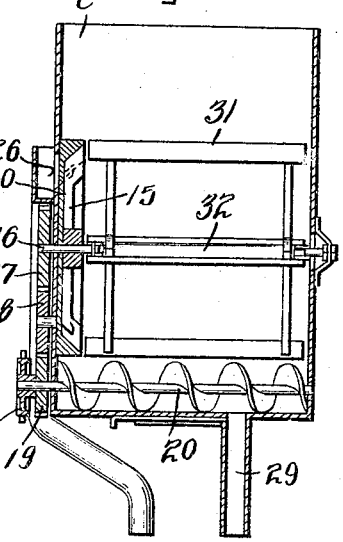
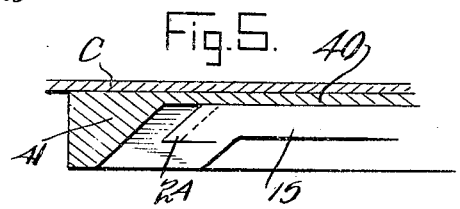
Inventor
George F. Sproull
By
Attorney Patented Jan. 15, 1924.

1,480,963

UNITED STATES PATENT OFFICE.

GEORGE F. SPROULL, OF MONTGOMERY, ALABAMA.

SEED PLANTER.

Application filed November 18, 1920. Serial No. 424,953.

*To all whom it may concern:*

Be it known that I, GEORGE F. SPROULL, a citizen of the United States, residing at Montgomery, in the county of Montgomery and State of Alabama, have invented certain new and useful Improvements in Seed Planters, of which the following is a specification.

My said invention consists in certain improvements in the details of construction and arrangement of parts of seed planters particularly machines designed for planting a variety of seeds, whereby the seed may be selected in any desired number and discharged into the furrow, as may be desired, and also a machine wherein, by slight changes, adaptations may be made for planting cotton seed as well as seeds of other characters, all as will be hereinafter more fully described and claimed.

Referring to the accompanying drawings which are made a part hereof and on which similar reference characters indicate similar parts, Figure 1 is a side elevation of a seed planter constructed in accordance with my said invention;

Figure 2, a cross section on the dotted line 2—2 in Figure 1;

Figure 3, a section looking in the direction indicated by the arrows on the dotted line 3—3 in Figure 2;

Figure 4, a view similar to Figure 2, showing a modified form; and

Figure 5 a detail view illustrating the end on one of the seed dropping arms on an enlarged scale.

In said drawings, the portions marked A represent the frame, B the wheels, and C the hopper, all of which are or may be of any appropriate design and construction suitable for carrying the various parts constituting the planter.

The hopper C has a partition 10 therein and a bottom 11 with its top surface inclined from the back side toward the side containing the dropping mechanism and partition 10 has an opening controlled by a sliding gate 12 whereby the seed contained in the chamber 13 of the hopper will be fed by gravity to the chamber 14 under control. Said partition and bottom are both removable.

A seed dropping wheel 15 is mounted on a stub-shaft 16 in bearings in the side of the hopper, said shaft having a gear 17 meshed with a gear 18 which in turn meshes with another gear 19 on a driving shaft 20 which is connected to be driven by the traction wheels B through a chain belt 21 running over a sprocket wheel 22 on said driving shaft and a sprocket wheel 23 on the axle of said wheels B.

The seed dropping wheel 15 is of a form most clearly shown in Figures 3 and 5. It consists of arms projecting radially from the center close to an encircling flange formed on the side of the hopper or on a plate fixed thereto and having faces formed on their forward sides to be adapted to pick up the seeds in the bottom of the hopper as said wheel rotates. While I have shown a wheel with four arms, any appropriate number may be employed. Near their points the arms of the wheel are formed with projecting lips outside of which there is just sufficient space for the number of seeds which it is desired to drop in each hill. Each lip forms the forward side of a pocket having its opposite side formed by the extended arm and its bottom sloping toward the hopper wall; i. e., toward the outside of the hopper and each pocket is normally closed at two sides by said wall and said flange until the arm in which it is formed reaches its uppermost position (see Figure 3). In some cases the number of seeds will be one; in other cases several. These faces are inclined toward the side of the hopper against which the wheel rotates and an opening 25 is formed in the side of the hopper at a point where the arms of the wheel outside the lips 24 will register therewith when said arms are in their uppermost position. Said opening communicates by means of a spout 26 with the chute 27 leading to the furrow. Said chute 27 is formed at its lower end in the form of a furrow-maker and is adapted to run in the furrow formed to receive the seeds. Any appropriate covering mechanism or device may be employed, as will be readily understood.

The partition 10 and bottom 11 are adapted to fit in the position shown in Figure 2 and may be readily removed when desired. Beneath said removable bottom, the hopper is formed with a transverse trough in which is mounted a screw conveyor 28 and a spout 29 leads from said trough into chute 27. A sliding gate 30 is provided to control the outlet from said trough to said chute 29. A reel 31 mounted on the shaft 32 is adapted to be mounted in the hopper on the inner end of the stub-shaft 16 and a stub 33 provided to receive the same, as shown. This reel is intended for agitating cotton seed which may be placed in the hopper.

In using the machine for planting peas, beans, and such like seed, including smaller seeds, the hopper is arranged as shown, particularly in Figure 2. In operation, the seed is placed in the compartment 13 of the hopper and runs through the opening in partition 10 into compartment 14 and as the dropping wheel rotates, the arms pick up a quantity of seed on their inclined faces adjacent the annular flange 41 of the plate 40 or the side of the hopper, and as the arm turns toward a vertical position, all the seeds except one, or the number desired for a hill, will fall back into the compartment 14 while the selected seed will be retained in the pockets 41 formed by the lip or projection 24 and carried to the opening 25 in the side of the hopper when they will slide outward off the outwardly inclined bottom of said pocket 41 into the spout 26 and from there to the chute 27 and to the furrow. The lip 24 will be formed to carry the number of seed desired for each hill, as will be readily understood. As the wheel rotates at regular speed, the seed will be dropped at regular intervals as the planter proceeds. When it is desired to plant cotton seed which cannot be handled by the wheel 15, the removable bottom 11 and partition 10 are removed, the pivoted section 42 of plate 40 is moved down to close the opening 25 and the cotton seed deposited in the hopper. The reel 31 tends to keep said cotton seed agitated and the conveyor 28 conveys it to the spout 29, the size of the opening into which is regulated by the sliding gate 30 and the screw conveyor operates to feed the cotton seed through said spout to the chute 27, as will be readily understood.

Having thus fully described my said invention, what I claim as new and desire to secure by Letters Patent, is:

1. A seed dispenser comprising a hopper, parallel vertically spaced shafts in the hopper, a feed wheel on the upper shaft adapted to feed to a discharge opening in the wall, a screw conveyor on the lower shaft adapted to feed to another discharge opening, gearing connecting said shafts for driving one from the other, and means whereby said devices are adapted to feed seeds of different character alternatively to the respective discharge openings, substantially as set forth.

2. In a convertible seed dispensing device, a hopper, a plurality of feed openings in the hopper, a chute leading to the ground, spouts leading from each opening to the chute, means whereby the feed through one of the openings may be stopped when the other is in use comprising a plate attached to a wall of the hopper beneath one of said openings and having a gate therefor, said plate having an annular inclined flange extending into the hopper, and a seed wheel fitting at its periphery into said flange and having pockets closed on two sides by said plate and said flange respectively, substantially as set forth.

3. A convertible seed dispenser comprising a hopper having openings at its side and bottom, spouts leading from each of said openings, a conveyor at the bottom of the hopper for carrying material to said bottom opening, a shaft for driving said conveyor, means to drive the shaft, a stud and a conveyor shaft above said shaft and parallel thereto, and adapted to support a reel-shaped stirrer, a seed wheel on the second shaft parallel and close to the wall, said wheel having pockets to carry seed to the side opening, means for closing said side opening, and means for driving said second shaft including a gear on each shaft and connections between said gears, substantially as set forth.

4. A seed dispenser comprising a hopper, parallel vertically spaced shafts in the hopper, a feed wheel on the upper shaft adapted to feed to a discharge opening in the wall, a screw conveyor on the lower shaft adapted to feed to another discharge opening, gearing connecting said shafts for driving one from the other, and a removable plate between the feed wheel and screw conveyor and forming the bottom of the hopper when the feed wheel is used, substantially as set forth.

In witness whereof, I have hereunto set my hand and seal at Washington, District of Columbia, this 21st day of October, A. D. nineteen hundred and twenty.

GEORGE F. SPROULL. [L. S.]